A. G. PITZ AND O. X. SAUR.
SKYLIGHT LIFT.
APPLICATION FILED MAR. 17, 1921.
1,423,817.                              Patented July 25, 1922.
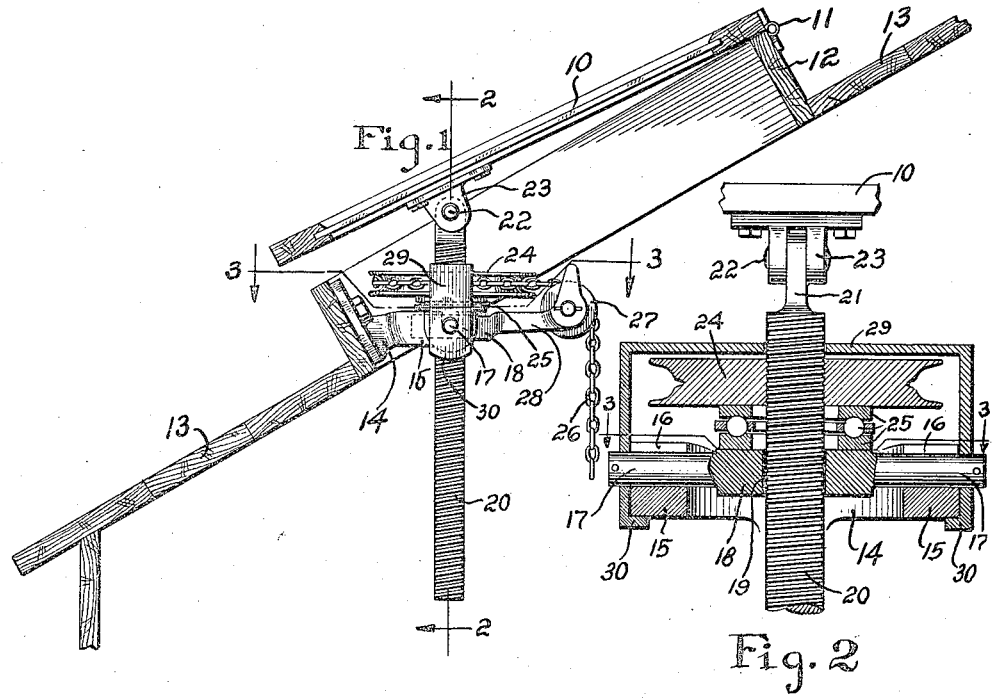
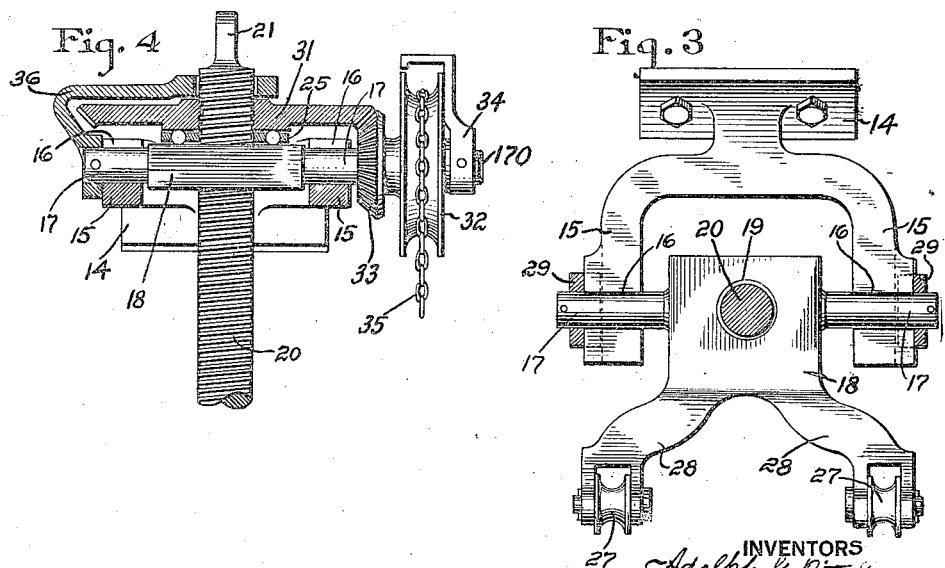
INVENTORS
Adolph G. Pitz and
Otto X. Saur
BY
A. M. Wooster
ATTORNEY

UNITED STATES PATENT OFFICE.

ADOLPH G. PITZ AND OTTO X. SAUR, OF BRIDGEPORT, CONNECTICUT, ASSIGNORS TO PARK CITY CORNICE WORKS, INC., OF BRIDGEPORT, CONNECTICUT, A CORPORATION OF CONNECTICUT.

SKYLIGHT LIFT.

1,423,817.      Specification of Letters Patent.      Patented July 25, 1922.

Application filed March 17, 1921. Serial No. 452,912.

*To all whom it may concern:*

Be it known that we, ADOLPH G. PITZ and OTTO X. SAUR, citizens of the United States, residing at Bridgeport, county of Fairfield, State of Connecticut, have invented an Improvement in Skylight Lifts, of which the following is a specification.

This invention has for its object to provide an improved device for raising, lowering and holding in any desired position a hinged skylight, trap door, or similar closure, (hereinafter, for convenience and brevity of description, referred to as a "skylight") which device may be easily operated, which will securely hold the skylight in the position into which it is adjusted, and whose connection with the skylight is a positive one but whose coacting parts are retained in the proper relative positions to secure reliable operation notwithstanding variations in the position assumed by the device as a whole in following the opening and closing movements of the skylight.

With the foregoing and other objects in view, we have devised the novel skylight lift, which we will now describe, reference being had to the accompanying drawings in which:

Fig. 1 is a side elevation of the device, showing the skylight in section.

Fig. 2 is an enlarged vertical section taken substantially on the line 2—2, Fig. 1.

Fig. 3 is a horizontal section taken substantially on the line 3—3, Figs. 1 and 2.

Fig. 4 is a view similar to Fig. 2, showing a modified construction.

Referring to Fig. 1, 10 denotes a skylight hinged at 11 to a hatch or box 12 surrounding an opening in a roof 13. 14 denotes a bracket bolted or otherwise secured to the interior of the hatch 12 at the side opposite the hinge 11. The bracket 14 is formed with a pair of forwardly extending, substantially horizontal arms 15 whose upper faces are formed with notches 16 in which are seated trunnions 17 on a rocker 18. The rocker 18 is provided with a smooth opening 19 (Figs. 2 and 3) extending therethrough from top to bottom and whose axis intersects the axis of the trunnions 17 and is substantially perpendicular thereto. Guided for longitudinal movement in the opening 19 is a screw or threaded rod 20 having a flattened upper end 21 pivoted at 22 between ears formed on a bracket 23 secured to the frame of the skylight 10. 24 denotes a nut in threaded engagement with the screw 20, which nut, in the form of the invention shown in Figs. 1 to 3, is in the form of a chain pulley supported on the rocker 18, an anti-friction thrust bearing 25 of any suitable or well known form being interposed between said chain pulley and rocker. 26 denotes a chain or other equivalent flexible operating member which passes about the pulley 24, the portions of said chain at opposite sides of said pulley passing over sheaves carried by forwardly extending arms 28 on the rocker 18, said sheaves 27 acting as guides for holding said chain in the proper operative relationship to said pulley. The parts are retained in assembled relation by means of a strap 29 overlying the pulley 24 and having an opening to receive the screw 20, said strap having depending portions the ends of which are bent inwardly beneath the arms 15 of the bracket 14 to form locking lips 30.

In operation, the chain 26, which is extended to a convenient point below the skylight, may be manipulated to turn the pulley or nut 24 in either direction, thereby moving the screw 20 upwardly or downwardly, and raising or lowering the skylight 10. As the skylight is raised or lowered, the pivot 22 will describe an arc about the hinge 11 as a center, causing the screw 20, and the rocker 18 in which it is guided, to swing about the axis of the trunnions 17. The pulley 24 will, of course, follow the swinging movements of the screw 20, as will also the guides 27 for the chain 26, which guides are carried by the rocker 18, thereby maintaining said chain in proper position to cooperate with the pulley irrespective of the angular position with respect to the horizontal assumed by the latter.

In the form of the invention shown in Fig. 4, the nut 31 which cooperates with the screw 20 is made in the form of a beveled gear, while one trunnion 170 of the rocker 18 is extended laterally to form an arbor for a chain pulley 32 having an integral or rigidly attached beveled pinion 33 meshing with the gear 31, said pinion 33 being retained in engagement with said gear by means of a keeper 34 secured to the end of the trunnion 170 and having a portion extended over the pulley 32 to prevent the accidental disengagement of the operating chain 35 therefrom. The gear 31 is, in turn, held against accidental disengagement from the pinion 33 by means of an arm 36 secured to the trunnion 17 opposite the trunnion 170, said arm being extended over the hub of the gear 31 and having an opening to receive the screw 20. The remaining parts of the device shown in Fig. 4 are or may be substantially the same as the corresponding parts in the form of the invention first described, as will be obvious without further explanation, and it will be noted that in this form of the invention also the operating means for the nut 31 which actuates the screw 20 are carried by the rocker in which said screw is guided, so as to be unaffected in their operation by the swinging movements of said screw.

It will also be seen that the screw and nut constitute an effective form of non-reversible gearing whereby the skylight will be securely retained in any position into which it may be adjusted until the mechanism is positively operated to move it into a different position.

Having thus described our invention, we claim:

1. A closure device comprising a bracket having spaced arms provided with aligned recesses open at one side of the arms, a rocker pivotally mounted in said recesses, a lifting screw, a pulley carried by the rocker and having threaded engagement with said screw for moving the latter, a flexible operating member cooperating with said pulley, a pair of guides for said operating member carried by said rocker, and a locking member extending over the pulley and engaging under the arms of the bracket to prevent removal of the pulley and screw.

2. A closure lifting device comprising a longitudinally movable screw adapted to be pivoted to the closure for lifting the same, a stationary bracket having spaced arms provided with aligned recesses open at one side of the arms, a rocker having trunnions in said recesses, a pulley having threaded engagement with the screw and carried by the rocker, flexible means for operating the pulley, guides on the rocker for said flexible means, and independent means embracing the trunnions and engaging under the arms of the bracket to retain the rocker in position in the bracket.

3. The combination with a hinged closure of means connected therewith for lifting the same comprising a longitudinally movable screw, a stationary bracket having spaced arms provided with recesses open at one side, a rocker provided with trunnions seated in said recesses, a pulley carried by the rocker and having threaded engagement with the screw, means for operating the pulley, and independent locking means engaging the trunnions and bracket to prevent removal of the rocker by lifting on the closure.

4. The combination with a hinged closure of means connected therewith for lifting the same comprising a longitudinally movable screw, a stationary bracket having spaced arms, a rocker provided with trunnions fulcrumed in said arms, a pulley carried by the rocker and having threaded engagement with the screw, means for operating the pulley, and independent locking means extending over the pulley and engaging under the arms to prevent removal of the pulley and screw by lifting the closure.

In testimony whereof we affix our signatures.

ADOLPH G. PITZ.
OTTO X. SAUR.